United States Patent [19]

Sollenberger

[11] 4,287,964

[45] Sep. 8, 1981

[54] TIMER

[75] Inventor: Edward Sollenberger, Triadelphia, W. Va.

[73] Assignee: Empire of Carolina, Inc., New York, N.Y.

[21] Appl. No.: 10,863

[22] Filed: Feb. 9, 1979

[51] Int. Cl.[3] .............. F03G 1/00

[52] U.S. Cl. .............. 185/38; 185/39; 368/97; 368/101

[58] Field of Search .............. 185/38, 39; 74/3.54; 58/21.13, 39.5, 74, 145 D; 368/97, 101, 103, 104, 105

[56] References Cited

U.S. PATENT DOCUMENTS

| | | | |
|---|---|---|---|
| 2,028,933 | 1/1936 | Johnson | 74/3.54 |
| 2,735,222 | 2/1956 | Glass | 185/38 X |
| 2,778,418 | 1/1957 | Laviana | 74/3.54 |
| 2,891,406 | 6/1959 | Stoner | 74/3.54 |
| 3,390,519 | 7/1968 | Cooper | 368/101 X |
| 3,648,454 | 3/1972 | Morrison | 368/97 X |
| 3,691,757 | 9/1972 | Merino et al. | 368/103 |
| 4,100,728 | 7/1978 | Chang et al. | 58/74 |
| 4,135,474 | 1/1979 | Kaplan | 58/21.13 X |

*Primary Examiner*—Allan D. Herrmann
*Attorney, Agent, or Firm*—Kirschstein, Kirschstein, Ottinger & Cobrin

[57] ABSTRACT

A timer adapted to toy applications, and in particular for use in conjunction with toy ride-on vehicles is provided. The timer includes a spring-driven mechanical motor manually windable to at least a predetermined time duration state and a manually displaceable mechanical switch for the selective stopping and starting of the mechanical motor for the measurement of elapsed time.

4 Claims, 5 Drawing Figures

TIMER

BACKGROUND OF THE INVENTION

This invention relates to timers usable with toys. The play value of a toy is greatly enhanced when the use thereof is "timed". The provision of a timer for "timing" in the use of toys creates opportunity for contests and self-testing not otherwise found in many toys. In the case of toy ride-on vehicles such as tricycles and the like, the play value of the vehicle would be enhanced if the child could measure the elapsed "time" in traversing from one point to another. While numerous sophisticated timer arrangements are available, ranging from sophisticated mechanical clock arrangements to electronic devices, such timers are not practical for application to most toys due to their cost.

Accordingly, it is desired to provide an inexpensive mechanical timer capable of being selectively started and stopped and readily usable by children of even a young age. By providing a spring-powered mechanical motor and a manually displaceable mechanical member adapted to cooperate with said spring motor to selectively start and stop same, the desired timer is provided.

SUMMARY OF THE INVENTION

Generally speaking, in accordance with the invention, a timer is provided including a spring-powered mechanical motor means, means for manually winding said motor means to tension the spring thereof, and switch means manually displaceable between a first position at which said switch means mechanically interengages with said motor means to stop same and a second position at which said motor means is free to run to provide an indication representative of elapsed time. The motor means may include frame means, a coil spring extending about and secured at one end to a drive shaft mounted on said frame means and secured at its other end to said frame means, step up gear train means supported by said frame means and operative by coupled to said drive shaft for driving thereby, and speed control governor means operatively coupled to said step up gear train for controlling the speed of rotation of said motor in response to the relaxation of the tension of said spring means. Said governor may be formed with a projection reciprocally displaced over a predetermined path, said switch means being displaceable into and out of said path for the selective stopping and starting of said motor.

The switch means may consist of a pivotably mounted member having a pair of projections on opposed sides of the axis of pivoting thereof manually engageable for the selective pivoting of said member between said first and second positions, and a third projection displaced into and out of the path of the governor in response to the pivotable displacement of the member.

Accordingly, it is an object of the invention to provide an inexpensive, readily operable mechanical timer.

Another object of the invention is to provide a timer particularly adapted for use with ride-on vehicles and capable of manual starting and stopping.

A further object of the invention is to provide a timer incorporating a mechanical spring-powered motor and a mechanical start-stop switch means.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
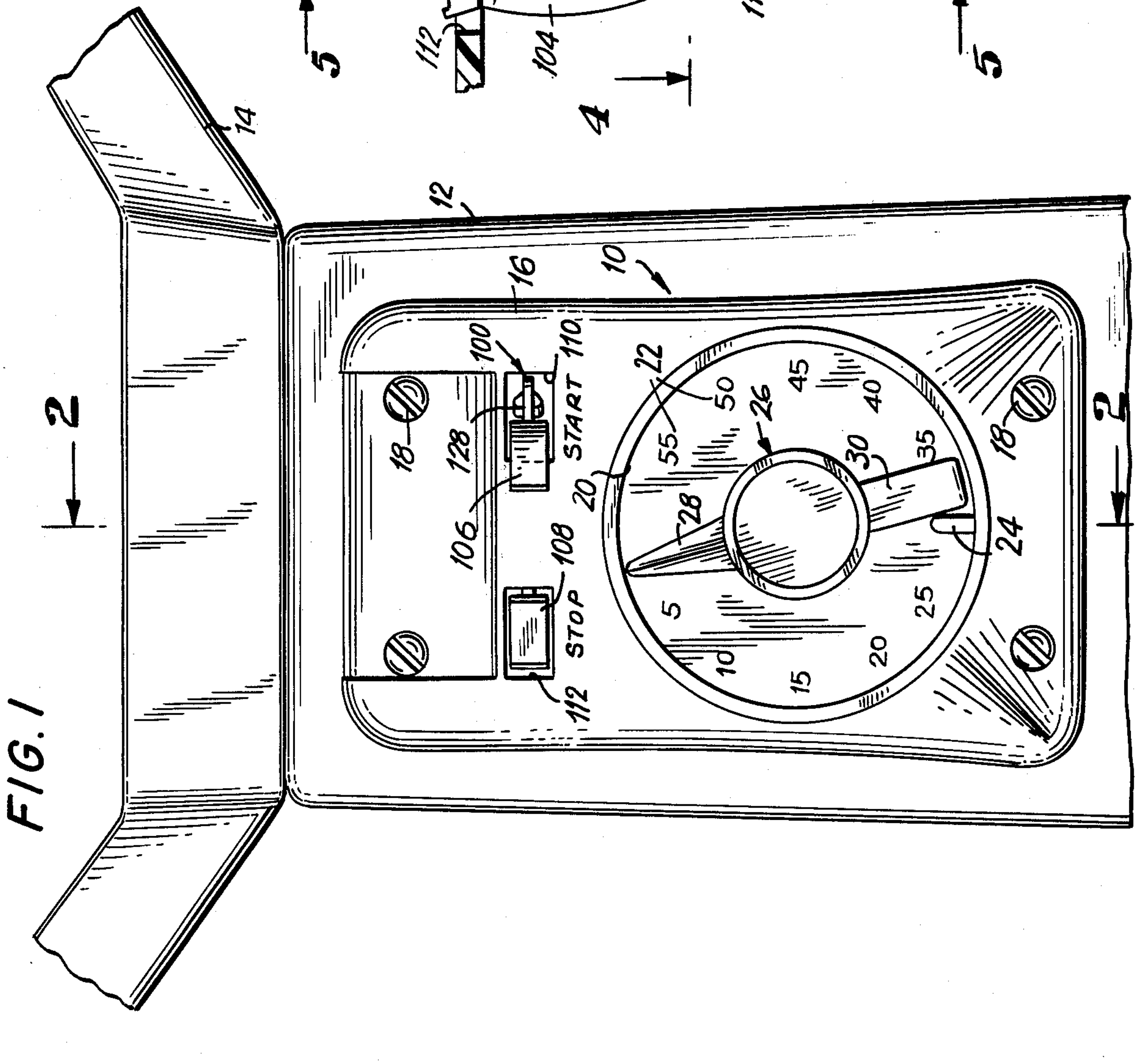
FIG. 1 is a top plan view of the timer in accordance with the invention mounted on the front post of a ride-on vehicle.
Figure 2:
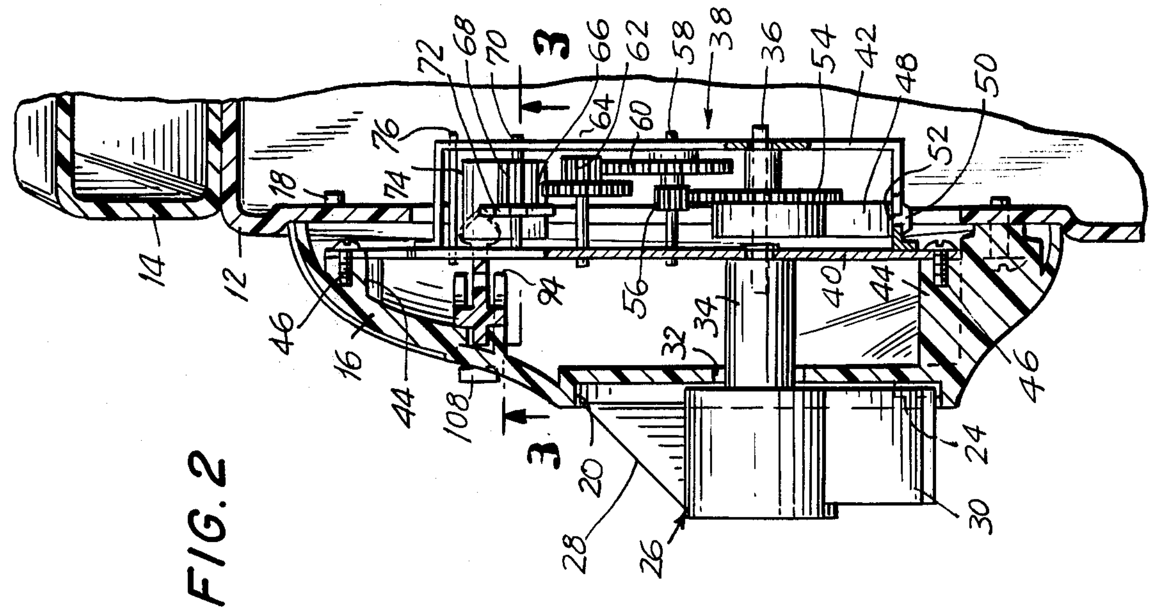
FIG. 2 is a sectional view taken along lines 2—2 of FIG. 1.

The timer 10 in accordance with the invention is depicted mounted on the center post 12 of a ride-on vehicle such as a tricycle, immediately below the steering handle bars 14. The timer includes a housing 16 secured to said center post 12 by four screws 18. Housing 16 is formed in its top surface with a circular recess 20, the bottom surface of which bears legends 22 representative of elapsed time in multiples of five, by way of example, approximately five seconds. At the lower central portion of circular recess 20 is a projecting rib 24 which serves as a stop member for a knob 26. Specifically, as more particularly shown in FIGS. 1 and 2, knob 26 is formed with a pointer 28 for providing a visual indication of elapsed time in cooperation with the legends 22 and a radial projecting portion 30 which is adapted to engage stop rib 24. The bottom surface of pointer 28 is spaced a sufficient distance from the bottom wall of circular recess 20 so as to clear the top of rib 24.

The bottom surface of circular recess 20 is formed with an aperture 32 therethrough providing access to the interior of housing 16. A hub portion 34 of knob 26 passes through aperture 32 and is fixedly secured to the drive shaft 36 of a spring motor shown generally at 38.

Spring motor 38 is provided with a top, essentially planar, frame member 40 and a U-shaped bottom frame member 42. Top frame member 40 is provided with forwardly and rearwardly projecting portions for engagement against bosses 44 in the underside of housing 16 and for securing to such bosses by means of screws 46.

The spaced parallel portions of top and bottom frame members 40, 42 of motor 38 serve as bridges for supporting drive shaft 36 and the remaining shafts of the step up gear train driven thereby. A coil spring 48 extends about drive shaft 36 and is secured at its inner end to such drive shaft. The outer end of coil spring 48 is formed with a tab 50 which extends through an aperture 52 in one leg of the U-shaped bottom housing 42, and is fixedly secured to such bottom housing by said tab. In this manner, when knob 26 is manually rotated in a counter clockwise direction as viewed in FIG. 1, coil spring 48 is tensioned. A first spur gear 54 is mounted on drive shaft 36 for rotation therewith and meshingly engages with pinion 56 secured to first intermediate shaft 58. A second spur gear 60 is coupled to pinion 56 for rotation therewith and is in meshing engagement with a second pinion 62 mounted on second intermediate shaft 64. Coupled to second pinion 62 for rotation therewith is a third spur gear 66 in meshing engagement with a third pinion 68 mounted on a third intermediate shaft 70. It is apparent that the pinion 68 rotates more rapidly than the spur gear 54. Intermediate shafts 58, 64 and 70 are all supported on frame members 40, 42. If desired, second intermediate shaft 64 may be mounted in arcuate slots in frame members 40, 42 which permit the displacement of said second intermediate shaft and the second pinion 62 and third spur gear 66 carried thereby in a direction such as to take third spur gear 66 out of meshing engagement with pinion 68 during the winding of the motor by knob 26. Such displacement would be limited by the ends of the slots. Second intermediate shaft 64 and the pinion and spur gear carried thereby would be displaced back to the position where spur gear 66 is in driving engagement with pinion 68. This arrangement permits the winding of the spring motor without rotating third intermediate shaft 70 and the pinion 68 and star wheel 72 carried thereby. As more particularly shown in FIG. 4, star wheel 72 is formed with six arms of equal length which cooperate with a speed control governor 74 mounted for oscillatory displacement by governor shaft 76 supported between top and bottom frame members 40 and 42. Governor 74 is formed with a semicircular central portion 78 and a pair of laterally extending end portions 80 and 82, laterally extending end portion 82 terminating in a bent portion 84 defining an obtuse angle with laterally extending end portion 82. As more particularly seen in FIGS. 3 and 4, bent portion 84 extends outside of the spaced intermediate frame members 40 and 42.

Figure 4:
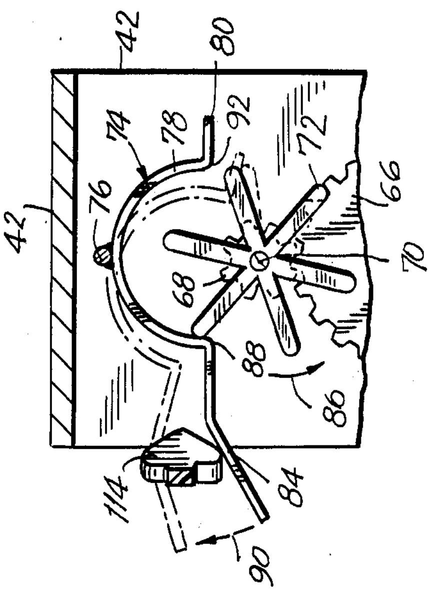
FIGS. 4 and 5 are sectional views taken along lines 4—4 and 5—5 respectively of FIG. 3.

Referring to FIG. 4, as star wheel 72 is rotated in the direction of arrow 86 by the release in the tension of coil spring 48, one arm thereof engages and brushes past corner 88 of governor 74 at the junction of laterally extending end portion 82 and semicircular portion 78, thereby camming the governor in a clockwise direction as viewed in FIG. 4 to cause the governor to pivot in the direction of arrow 90 about the axis of rotation of governor shaft 76 to the position shown in chain lines. At this position, another arm of star wheel 72 will thereafter engage and brush past corner 92 of governor 74, at the intersection therefore of laterally extending end portion 80 and semicircular portion 78, thereby camming the governor in a counter clockwise direction as viewed in FIG. 4 to cause the governor to rotate back to the position shown in solid lines in FIG. 4. In this manner, the governor is reciprocated rapidly between two positions, serving to regulate the speed of rotation of the spring motor. The rate of reciprocation is six times (because of the six arms of the star wheel), faster than the rate of rotation of the pinion 68 and, of course, the governor experiences two oscillatory movements (one clockwise, the other counterclockwise) for each cycle of its oscillations.

Housing 16 is provided with a pair of downwardly projecting, spaced walls 94 in a region overlying motor top frame member 40 and in registration with governor 74. Walls 94 are formed with aligned slots 96 in the bottom thereof for receipt of a pivoting axle 98 of a switch member 100.

Figure 3:
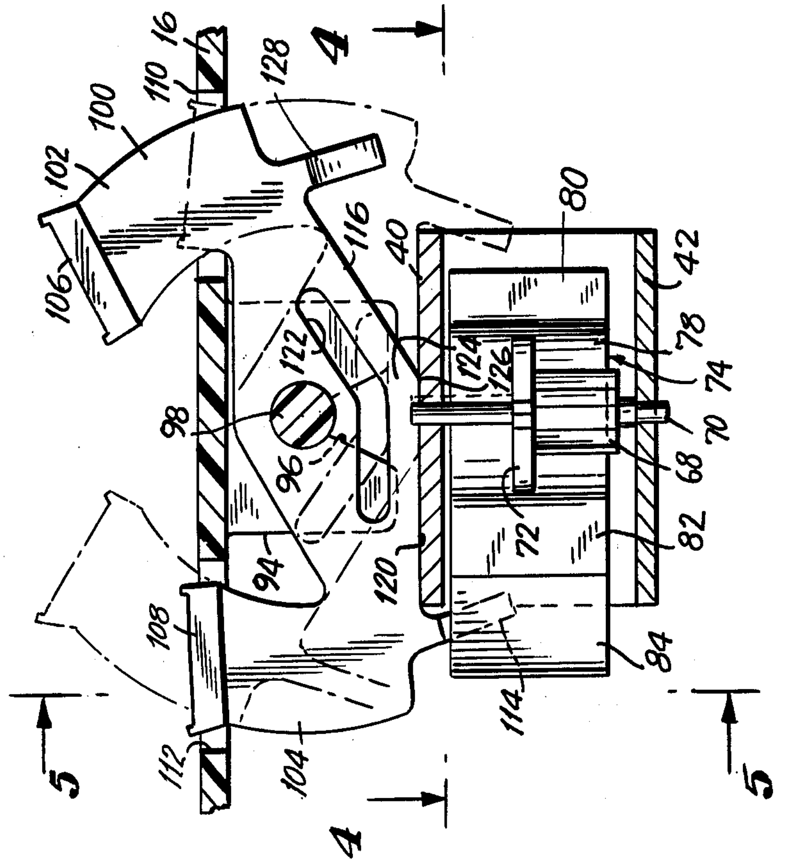
FIG. 3 is a sectional view taken along lines 3—3 of FIG. 2.
Figure 5:
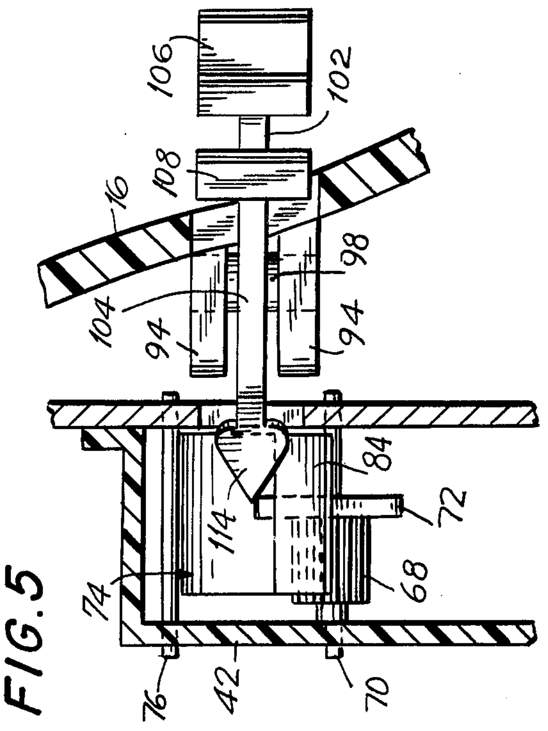

Switch member 100 is provided with a pair of upwardly projecting arcuate projections 102, 104 terminating in manually operable push contact surfaces 106, 108 respectively. Housing 16 is formed with a pair of apertures 110, 112, which permit the start and stop projections 102, 104, respectively, of switch member 100 to project to the exterior of housing 16 for manipulation by a user. Downwardly projecting from the arcuate projection 104 is a heart-shaped projection 114. The central region of switch member 100 is formed with a pair of essentially planar bearing surfaces 116 and 120 adapted to engage the top surface of top frame member 40 at respective first and second positions of said switch member. As illustrated in FIG. 3, the switch member is in its second position at which heart-shaped projection 114 is positioned in the path of the oscillating movement of governor 74, specifically in the path of bent portion 84 thereof as shown in FIGS. 3, 4 and 5. In this position, projection 114 prevents the further advance of motor 38. After winding, to re-start the motor, it is merely necessary for the user manually to engage start contact surface 106 of arcuate projection 102 to pivotably displace switch member 100 to its alternate orientation, shown in chain lines in FIG. 3, wherein planar bearing surface 116 engages the top surface of top frame member 40 and heart-shaped projection 114 is out of the path of governor 74. In this "start" orientation, the motor is free to run until stop contact surface 108 is engaged to displace the switch member 100 to the position shown in solid lines in FIG. 3, at which position the motor is stopped, to provide an indication of elapsed time as read by the position of pointer 28.

Switch member 100 is provided with central laterally extending slot 122 to form a resilient region 124 between slot 122 and bearing surfaces 116, 120 which permits the displacement of said switch member between its first and second positions over bottom corner 126 between said bearing surfaces, to thereby provide a positive positioning of the switch member at each of its positions.

While switch member 100 is depicted with two heart-shaped projections 114, 128, one on each side thereof, only projection 114 is operative. Heart-shaped projection 128 is provided for convenience of assembly so that the assemblers need not concern themselves with the proper orientation of the switch member, and can be eliminated. The orientation of the heart-shaped projection 114 permits the proper operation of switch member 100 without regard to the orientation of governor 74 at the moment of engagement by the user of contact surface 108 since the camming surfaces defined by the heart-shaped projection 114 will displace the governor to one of the two rest positions shown in FIG. 4.

The foregoing construction is readily assembled, has few parts, is relatively inexpensive to manufacture and is readily used by even the youngest child. Accordingly, it both enhances the play value of the device with which it is associated while not unduly adding to the cost thereof.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall thereunder.

What is claimed is:

1. A timer comprising: a housing, a spring-powered mechanical motor means mounted in said housing, said motor means including spring means and step up gear train means driven by said spring means for advancement during the relaxation of the tension in the spring means, switch means manually manipulatable from outside of said housing, said switch means being displaceable between a first position at which said switch means stops the advancement of said motor driven means and a second position at which said switch means permits said motor to advance, and speed governor means coupled to said gear train means for regulating the speed of rotation of said gear train means, said speed governor means being reciprocally oscillatable along a path by said gear train means, said switch means including a projection displaceable into and out of the path of said governor means when said switch means is displaced from its first toward its second position, said switch projection being formed with camming surfaces for displacing said governor means out of its path during displacement of said switch means from said second to said first position thereof.

2. The timer as claimed in claim 1 wherein said motor means includes first and second frame members supporting said gear train means and governor means therebetween, said governor means having a reciprocally oscillatable region extending outside of the space between said frame members for engagement by said projecting portion of said switch means, and wherein said switch means is pivotally mounted on said housing and includes first and second bearing surfaces alternately engaging against a frame member for defining said first and second positions of said switch means.

3. The timer as claimed in claim 2, wherein said switch means includes spring means intermediate said bearing surfaces to permit the displacement of said switch means between its first and second positions while positively positioning said switch means at each of said first and second positions.

4. The timer as claimed in claim 3, wherein said switch means is formed of a unitary body formed with essentially planar bearing surfaces at the bottom thereof defining an obtuse angle therebetween, said body of said switch member being formed with a slot extending substantially parallel to said bearing surfaces at the intersection thereof for defining said spring means.

* * * * *